United States Patent
Uppala et al.

(10) Patent No.: US 10,274,911 B2
(45) Date of Patent: Apr. 30, 2019

(54) CONVERSATIONAL INTERFACE FOR MATCHING TEXT OF SPOKEN INPUT BASED ON CONTEXT MODEL

(71) Applicant: Intel Corporation, Santa Clara, CA (US)

(72) Inventors: Anantha Deepthi Uppala, Hillsboro, OR (US); Kara E. Jackson, Seattle, WA (US); Mark D. Yarvis, Portland, OR (US); David J. Cobbley, Portland, OR (US); Andrew S. Dickinson, Tigard, OR (US); Milind Pandit, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/750,482

(22) Filed: Jun. 25, 2015

(65) Prior Publication Data

US 2016/0378080 A1 Dec. 29, 2016

(51) Int. Cl.
*G10L 15/06* (2013.01)
*G10L 15/183* (2013.01)
(Continued)

(52) U.S. Cl.
CPC .............. *G05B 15/02* (2013.01); *G10L 15/22* (2013.01); *G05B 2219/2642* (2013.01);
(Continued)

(58) Field of Classification Search
CPC . G10L 15/18; G10L 15/1815; G10L 15/1822; G10L 15/183; G10L 15/22;
(Continued)

(56) References Cited

U.S. PATENT DOCUMENTS 8,346,563 B1    1/2013  Hjelm
8,595,642 B1 *  11/2013 Lagassey ................ G10L 15/22
                                                        704/275
(Continued)

OTHER PUBLICATIONS

International Search Report for PCT/US16/034053, dated Sep. 19, 2016 (3 pages).
(Continued)

*Primary Examiner* — Martin Lerner
(74) *Attorney, Agent, or Firm* — Barnes & Thornburg LLP

(57) ABSTRACT

Technologies for conversational control of a home automation system include a computing device in communication with one or more home automation devices. The computing device receives text input indicative of a spoken user request including one or more parameters associated with a home automation command. The computing device matches the text input against a home automation language model including several predefined dialog patterns. The computing device resolves parameters of the command using a context model. The computing device may resolve the location, device, or requested device state of the command. The computing device generates a text response and a home automation command using the language model, and then presents the text response to the user and performs the home automation command using the home automation devices. In some embodiments, the computing device may control an application automation system or a data exploration system. Other embodiments are described and claimed.

20 Claims, 8 Drawing Sheets

(51) Int. Cl.
  *G05B 15/02* (2006.01)
  *G10L 15/22* (2006.01)
  *G10L 13/00* (2006.01)
  *G10L 15/26* (2006.01)

(52) U.S. Cl.
  CPC ............ *G10L 13/00* (2013.01); *G10L 15/183* (2013.01); *G10L 15/26* (2013.01); *G10L 2015/223* (2013.01); *G10L 2015/227* (2013.01); *G10L 2015/228* (2013.01)

(58) Field of Classification Search
  CPC ............ G10L 15/256; G10L 2015/223; G10L 15/265; G10L 15/06
  USPC ..... 704/255, 257, 270, 270.1, 275, 243, 244
  See application file for complete search history.

(56) References Cited

U.S. PATENT DOCUMENTS

| | | | | |
|---|---|---|---|---|
| 8,831,957 | B2* | 9/2014 | Taubman | G10L 15/183 704/270 |
| 9,053,708 | B2* | 6/2015 | Koch | G10L 15/30 |
| 9,129,601 | B2* | 9/2015 | Stent | G10L 15/183 |
| 9,230,560 | B2* | 1/2016 | Ehsani | G10L 15/22 |
| 9,324,323 | B1* | 4/2016 | Bikel | G10L 15/183 |
| 2002/0069063 | A1* | 6/2002 | Buchner | G10L 15/26 704/270 |
| 2002/0123891 | A1* | 9/2002 | Epstein | G10L 15/197 704/235 |
| 2012/0065971 | A1 | 4/2012 | Schrager | |
| 2012/0089392 | A1* | 4/2012 | Larco | G10L 15/22 704/275 |
| 2013/0144616 | A1* | 6/2013 | Bangalore | G10L 15/1822 704/275 |
| 2013/0226580 | A1 | 8/2013 | Witt-Ehsani et al. | |
| 2014/0039888 | A1* | 2/2014 | Taubman | G10L 15/30 704/235 |
| 2014/0108019 | A1* | 4/2014 | Ehsani | G10L 15/22 704/275 |
| 2014/0136013 | A1* | 5/2014 | Wolverton | G10L 15/22 701/1 |
| 2014/0156281 | A1 | 6/2014 | Boyd et al. | |
| 2014/0278413 | A1* | 9/2014 | Pitschel | G10L 15/063 704/243 |
| 2014/0365227 | A1 | 12/2014 | Cash et al. | |
| 2015/0142704 | A1* | 5/2015 | London | G10L 15/22 706/11 |
| 2015/0355649 | A1* | 12/2015 | Ovadia | G10L 15/20 704/233 |

OTHER PUBLICATIONS

Written Opinion for PCT/US16/034053, dated Sep. 19, 2016 (7 pages).
Extended European search report for European patent application No. 16814948.2, dated Jan. 23, 2019 (7 pages).

* cited by examiner

CONVERSATIONAL INTERFACE FOR MATCHING TEXT OF SPOKEN INPUT BASED ON CONTEXT MODEL

BACKGROUND

Home automation systems include devices and software capable of controlling building functions such as lighting, climate control, security, and other functions. For example, home automation systems may provide for centralized control of light switches, dimmers, thermostats, heating ventilation and air conditioning (HVAC) systems, building sensors, and other household devices. Typical home automation systems may be operated using "control panel"-type hardware and/or software interfaces that allow a user to manually operate each home automation device. For example, the user may turn on lights by operating various wall switches and/or manually clicking various options in a home automation application executed by a standard computer.

Certain computing devices may implement conversational user interfaces, which may allow for back-and-forth interaction between the computing device and user. For example, a conversational user interface may maintain a memory of the current conversation and generate clarifying questions as part of the conversation. Typical conversational user interfaces may require complex machine learning algorithms and/or training using large data sets. Alternatively, Chatbots (also known as "chatterbots") allow a programmer to use a scripting language to develop interactions with the user that respond to natural language requests in an apparently conversational way. Chatbots such as ELIZA have existed at least since the 1960s. Current computing devices may implement chatbots using a scripting and pattern matching language such as ChatScript.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
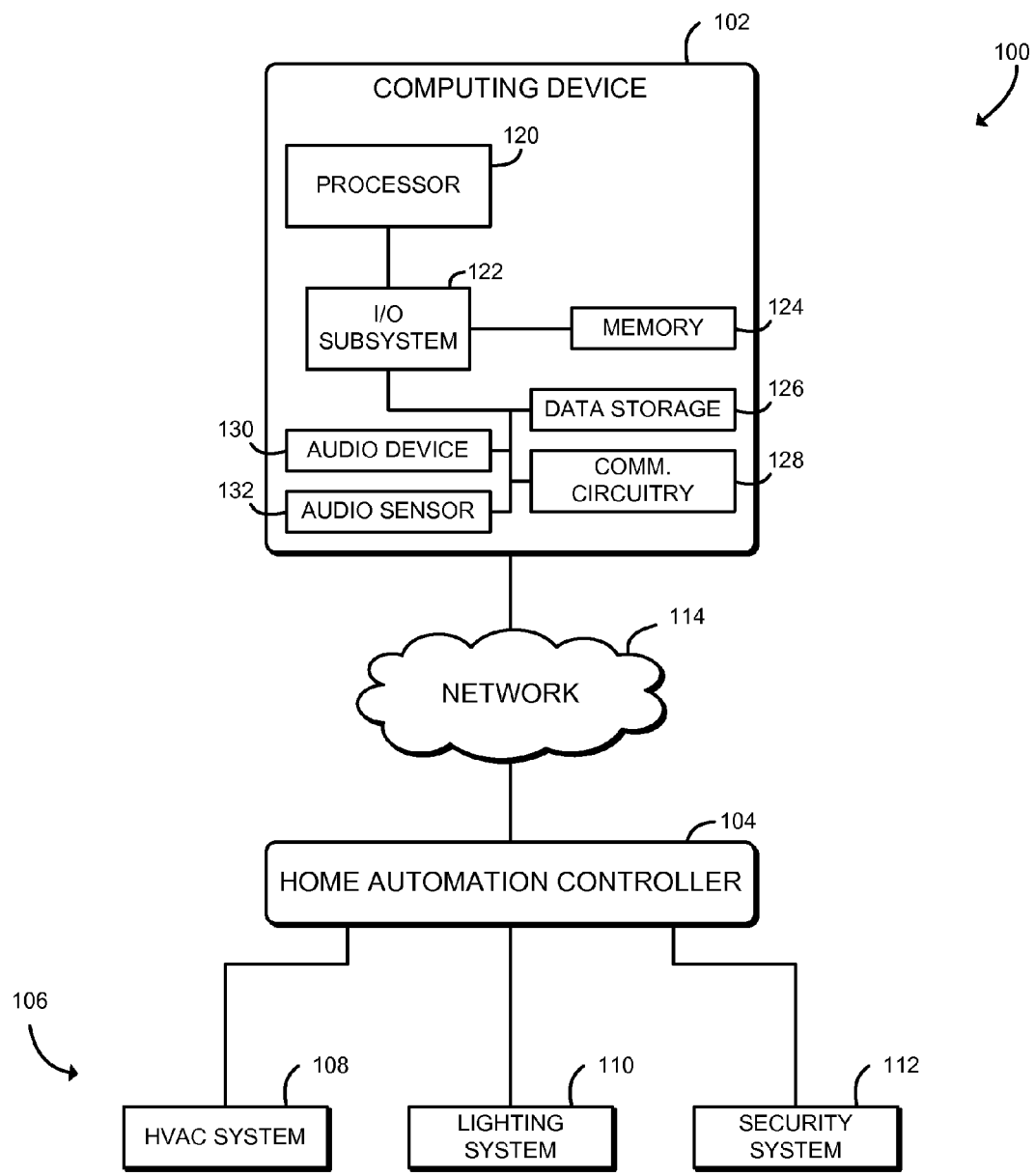
FIG. 1 is a simplified block diagram of at least one embodiment of a system for a conversational interface for home automation control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for a conversational interface for home automation control includes a computing device 102, a home automation controller 104, and one or more home automation devices 106 in communication over a network 114. In use, a user provides the computing device 102 with input text that is indicative of a spoken home automation command such as "Turn on the lights." The computing device 102 matches the input text against a home-automation-specific language model that includes several dialog patterns representing potential interactions with a home automation system. The language model may be defined using a chatbot scripting language such as ChatScript. After matching a pattern and identifying a requested home automation command, the computing device 102 may resolve ambiguous parameters of the command using context data. The context data may include conversational context data as well as context data based on the current user and/or on the state of the home automation devices 106. For example, when supplied with the input text "Turn on the lights," the computing device 102 may identify the particular lights to be controlled based on conversational context data (e.g., which location within the home is the topic of the conversation), user context data (e.g., where is the user located), and/or device context data (e.g., what lights in the system are not currently on). After resolving the parameters of the command, the computing device 102 may generate a natural language response and a home automation command based on the language model, and then execute the home automation command using the home automation controller 104 and/or the home automation devices 106. If the command is not sufficiently resolved, the computing device 102 may generate a follow-up question using the language model for the user to resolve additional parameters. Thus, the computing device 102 may provide an intuitive and efficient conversational interface for controlling a home automation system. By using a predefined domain-specific language model, the computing device 102 may provide a conversational interface without performing complex machine learning algorithms and/or training using large data sets. Additionally, in some embodiments the computing device 102 may provide conversational control of systems other than home automation systems by using an appropriate domain-specific language model.

The computing device 102 may be embodied as any type of device capable of performing the functions described herein. For example, the computing device 102 may be embodied as, without limitation, a desktop computer, a server, a consumer electronic device, a smart appliance, a notebook computer, a laptop computer, a smartphone, a cellular phone, a tablet computer, distributed computing system, a multiprocessor system, and/or any other computing device capable of performing the functions described herein. As shown in FIG. 1, the illustrative computing device 102 includes a processor 120, an I/O subsystem 122, memory 124, a data storage device 126, and communication circuitry 128. Of course, the computing device 102 may include other or additional components, such as those commonly found in a portable computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the computing device 102 may be embodied as any communication circuit, device, or collection thereof, capable of enabling communications between the computing device 102, the home automation devices 106, and/or other remote devices. The communication circuitry 128 may be configured to use any one or more communication technology (e.g., wireless or wired communications) and associated protocols (e.g., Ethernet, Bluetooth®, Wi-Fi®, WiMAX, Zigbee, Zwave, etc.) to effect such communication. In some embodiments, the communication circuitry 128 may use special-focus communication protocols to provide interconnectivity to member devices in a local Internet of Things (IoT).

The computing device 102 may further include an audio device 130 and an audio sensor 132. The audio device 130 may be embodied as any device capable of generating audio signals for output, such as a paper cone speaker, an audio transducer, an audio output jack, a digital-to-analog converter (DAC), or other type of audio device. The audio device 130 may be used by the computing device 102 to output speech responses to the user, as described below. The audio sensor 132 may be embodied as any sensor capable of capturing audio signals such as a microphone, a line input jack and associated circuitry, an analog-to-digital converter (ADC), or other type of audio sensor. The audio sensor 132 may be used by the computing device 102 to detect speech commands uttered by the user, as described below.

The home automation controller 104 is configured to execute rules, receive sensor and actuator changes, trigger actions, and otherwise control the home automation devices 106. The home automation controller 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the home automation controller 104 includes components and devices commonly found in a server or similar computing device, such as a processor, an I/O subsystem, a memory, a data storage device, and/or communication circuitry. Those individual components of the home automation controller 104 may be similar to the corresponding components of the computing device 102, the description of which is applicable to the corresponding components of the home automation controller 104 and is not repeated herein so as not to obscure the present disclosure. The home automation controller 104 may be embodied as a computing device located at the home controlled by the home automation system or as one or more remote devices, such as a cloud-based service. Accordingly, in some embodiments, the home automation controller 104 may be embodied as a "virtual server" formed from multiple computing devices distributed across the network 114 and operating in a public or private cloud. Accordingly, although the home automation controller 104 is illustrated in FIG. 1 as embodied as a single computing device, it should be appreciated that the home automation controller 104 may be embodied as multiple devices cooperating together to facilitate the functionality described below. Additionally, although illustrated as including a separate computing device 102 and home automation controller 104, it should be understood that in some embodiments those functions may be combined in a single computing device.

Each of the home automation devices 106 may be embodied as a smart appliance, connected device, smart thermostat, connected sensor, embedded computing device, or other computing device or collection of devices capable of performing the functions described herein. Accordingly, each home automation device 106 may include components and devices similar to computing device 102, such as a processor, an I/O subsystem, a memory, a data storage device, communication circuitry, and/or other peripheral devices. As illustrated in FIG. 1, the home automation devices 106 may include an HVAC system 108, a lighting system 110, and a security system 112. The HVAC system 108 may include a smart thermostat, heater, air conditioner, and/or other building comfort systems. The lighting system 110 may include one or more light switches, dimmers, lights, and other devices. The security system 112 may include door locks, security cameras, sensors such as motion sensors, light sensors, and/or contact sensors, building safety systems (e.g., smoke detectors, carbon monoxide detectors, sprinkler systems, etc.), alarms, and/or other security systems. Of course, in other embodiments, the home automation devices 106 may include additional or different devices and/or systems, such as smart appliances, entertainment systems, and other home automation devices.

As discussed in more detail below, the computing device 102, the home automation controller 104, and the home automation devices 106 may be configured to transmit and receive data with each other and/or other devices of the system 100 over the network 114. The network 114 may be embodied as any number of various wired and/or wireless networks. For example, the network 114 may be embodied as, or otherwise include, a wired or wireless local area network (LAN), a wired or wireless wide area network (WAN), and/or a publicly-accessible, global network such as the Internet. As such, the network 114 may include any number of additional devices, such as additional computers, routers, and switches, to facilitate communications among the devices of the system 100. In some embodiments, the network 114 may include a pervasive network of smart embedded devices, such as a local or global Internet of Things (IoT).

Figure 2:
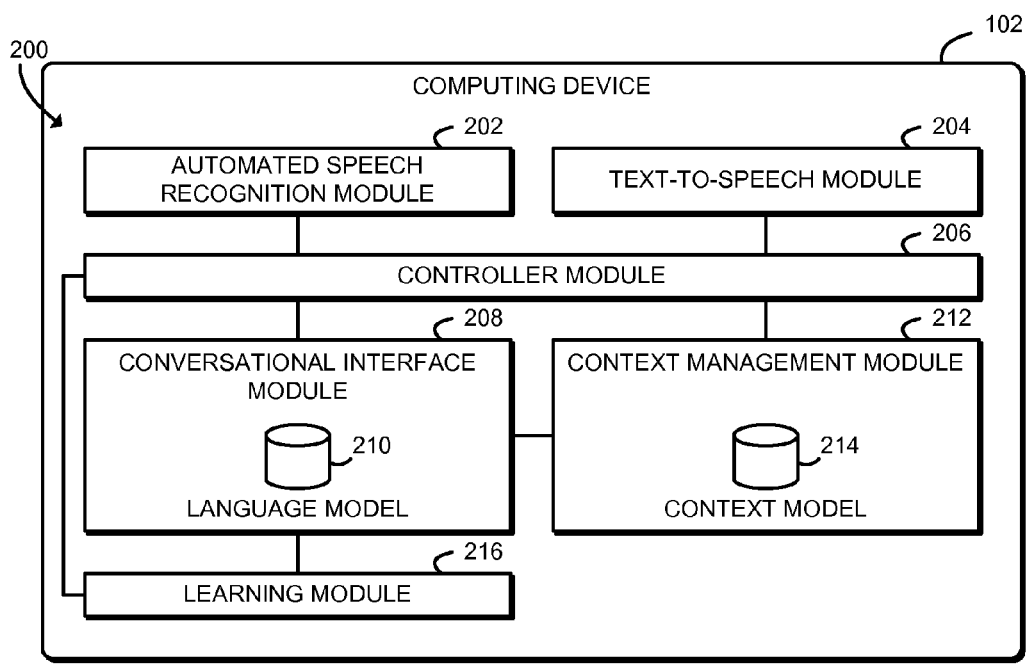
FIG. 2 is a simplified block diagram of at least one embodiment of an environment that may be established by a computing device of the system of FIG. 1.

Referring now to FIG. 2, in the illustrative embodiment, the computing device 102 establishes an environment 200 during operation. The illustrative environment 200 includes an automated speech recognition module 202, a text-to-speech module 204, a controller module 206, a conversational interface module 208, a context management module 212, and a learning module 216. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 102. As such, in some embodiments, any one or more of the modules of the environment 200 may be embodied as a circuit or collection of electrical devices (e.g., a controller circuit, a conversational interface circuit, etc.).

The automated speech recognition module 202 is configured to perform automated speech recognition on audio input data to generate input text. Similarly, the text-to-speech module 204 is configured to generate audio speech output based on response text using a text-to-speech engine.

The controller module 206 is configured to receive input text indicative of a spoken user request including one or more parameters associated with a system control command. After the computing device 102 processes the input text as described further below, the controller module 206 is further configured to present a text response to the user of the computing device 102 and perform the system control command. In some embodiments, the system control command may be embodied as a home automation command including home automation parameters such as a location (e.g., a room within the home), a home automation device 106, and/or a requested device state (e.g., on or off). The controller module 206 may be configured to determine whether the home automation command is valid based on the state of the associated home automation system. Additionally or alternatively, the system control command may be embodied as an application control command including application control parameters such as an application interface command or an application object. In some embodiments, the system control command may be embodied as a data exploration command including data exploration parameters such as a data query parameter. In some embodiments, the controller module 206 may be further configured to receive non-textual input data indicative of the user request, such as video data or sensor data.

The conversational interface module 208 is configured to match the input text against a language model 210 to identify a matching pattern. The language model 210 includes several domain-specific dialog patterns, and each pattern may be associated with a corresponding system control command. The language model 210 may also include domain-specific dictionaries providing lists of synonyms or related words that may also be used for matching the input text. The conversational interface module 208 is configured to generate a text response using the language model 210 and to generate the system control command (e.g., a home automation command, an application control command, or a data exploration command) using the language model 210. The conversational interface module 208 is configured to generate the system control command after parameters of the system control command are determined by the context management module 212, as described below. The conversational interface module 208 may be configured to determine whether the system control command is sufficiently resolved prior to generating the system control command and to generate a follow-up question for the text response using the language model 210 if the system control command is not sufficiently resolved. The conversational interface module 208 may be further configured to generate an error message for the text response using the language model 210 if the system control command is not valid based on the state of the home automation device 106 context data.

The context management module 212 is configured to determine one or more of the parameters of the system control command using a context model 214. The context model 214 may include context data representing the state of the current conversation, the state of the user, the state of the system controlled by the computing device 102, or other appropriate contextual data. For example, in use with a home automation system, the context model 214 may include conversational context data, user context data, and home automation device 106 context data. The context management module 212 may be configured to update the context model 214 based on data received from the system being controlled, such as the home automation system (including one or more of the home automation devices 106). As another example, in use with an application control system, the context model 214 may include conversational context data and application context data, such as open files, the current view, recent commands, or other application context. As yet another example, in use with a data exploration system, the context model 214 may include conversational context data and query context data including parameters or other data relating to previous queries.

The learning module 216 is configured to update the language model 210 by performing learning by example. In particular, the learning module 216 is configured to observe a change in device state of the home automation system in response to performance of the home automation command and generate a new pattern based on the input text. The new pattern is associated with the home automation command. For example, the new pattern may be based on individualized vocabulary or speech patterns used by the user to request a particular home automation command. The learning module 216 is further configured to update the language model 210 to include the new pattern.

Although illustrated as being established by the computing device 102, it should be understood that in some embodiments part or all of the environment 200 may be established by one or more computing devices distributed over a network such as the Internet. For example, in some embodiments part or all of the functions of the automated speech recognition module 202 and/or the text-to-speech module 204 may be performed by a remote and/or cloud-based speech recognition server. As another example, in some embodiments part or all of the functionality of the conversational interface module 208 (including the language model 210) and/or the context management module 212 (including the context model 214) may be provided by or maintained by one or more remote servers over the Internet.

Figure 3A:
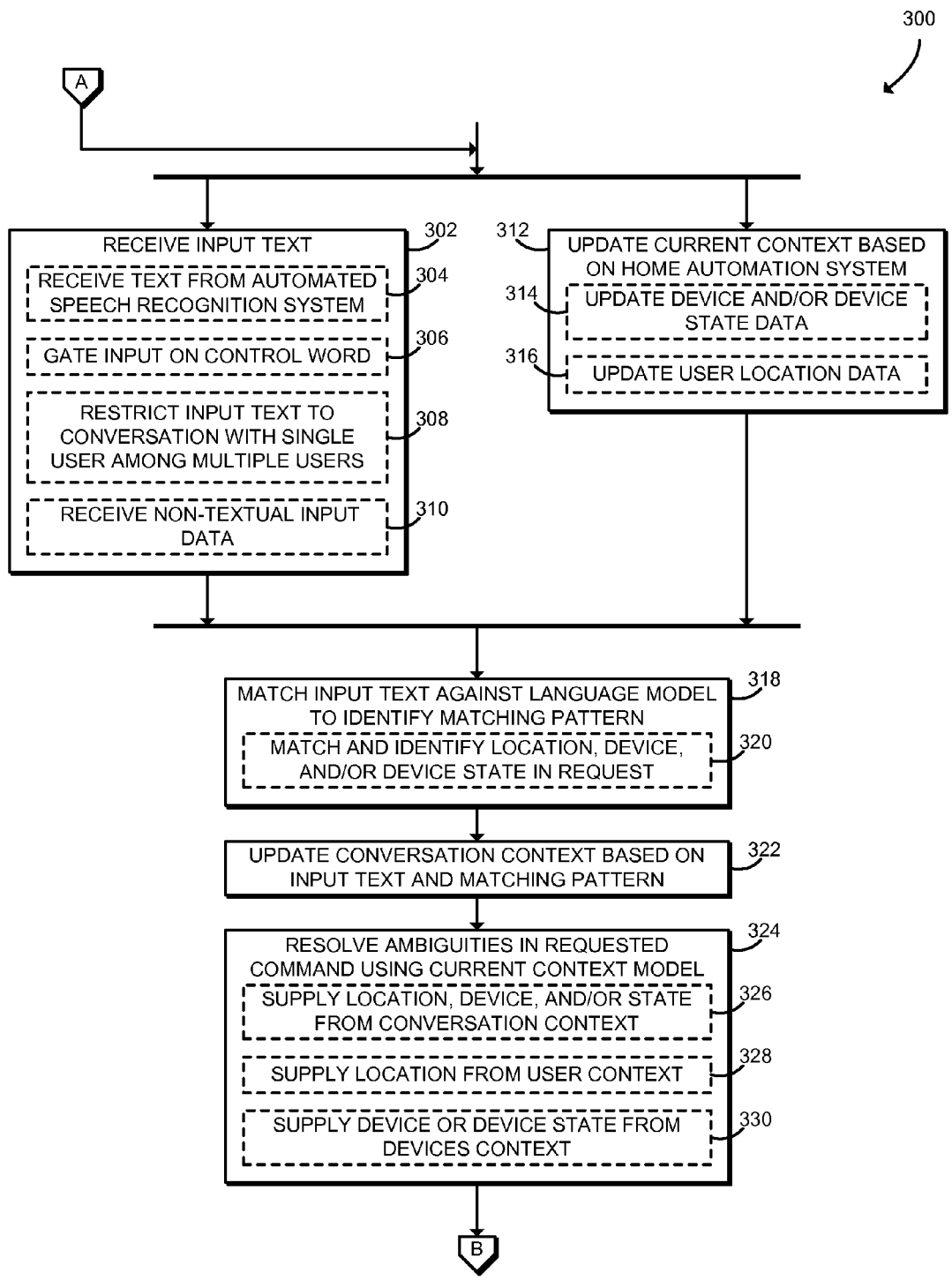
FIGS. 3A and 3B is a simplified flow diagram of at least one embodiment of a method for conversational control of a home automation system that may be executed by the computing device of FIGS. 1 and 2.
Figure 3B:
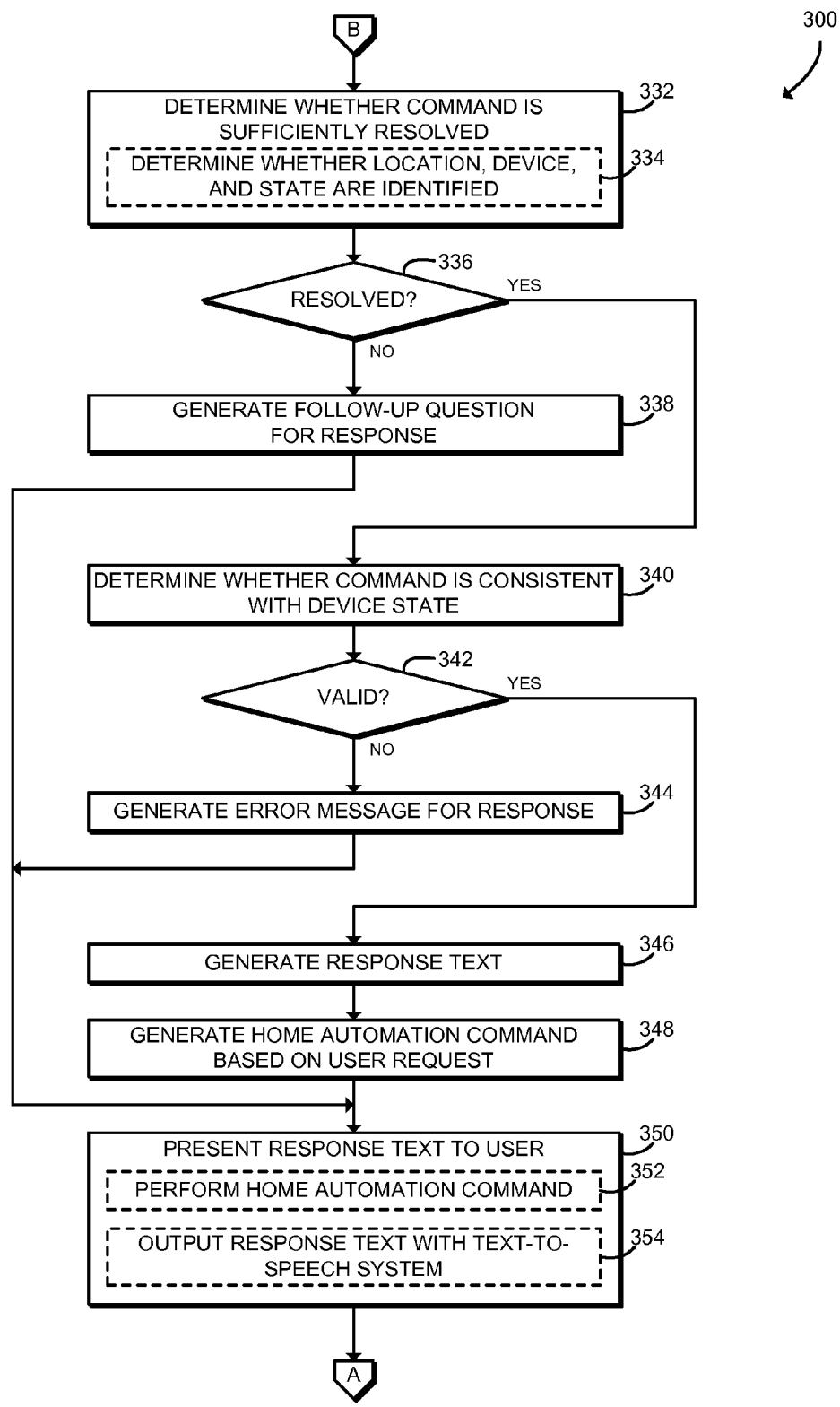

Referring now to FIGS. 3A and 3B, in use, the computing device 102 may execute a method 300 for conversational control of a home automation system. The method 300 begins with block 302 and block 312, executed in parallel. In block 302, the computing device 102 receives input text from a user of the computing device 102. The input text may represent a spoken user request relating to the home automation system, including one or more parameters associated with a home automation system command. For example, the user request may include a command to adjust the device state of one or more home automation devices 106 that are identified by location. As another example, the user request may include a command to query the state of one or more home automation devices 106. The input text is a natural language request and thus may not conform to any particular predefined format or syntax. For example, the input text may be embodied as the statement, "Turn on the lights," "Turn the heat up," or similar. In particular, the input text may not include all parameters required to execute the home automation command.

In some embodiments, in block 304 the computing device 102 may receive the input text from an automated speech recognition system. The computing device 102 may use any appropriate speech recognition system, including local speech recognition systems, cloud-based speech recognition systems, or any other speech recognition system. In block 306, the computing device 102 may gate the input text on a control word. In other words, the computing device 102 may disregard spoken commands that are not preceded by the control word. The control word may be embodied as a name or other identifier associated with the computing device 102. For example, the computing device 102 may respond to commands similar to "Homer, turn on the lights," but disregard commands that do not start with "Homer." Additionally or alternatively, in some embodiments the computing device 102 may use any other technique to activate input processing, including monitoring multiple modes of input. For example, in some embodiments the computing device 102 may activate input processing in response to a particular user gesture or in response to the user looking in the direction of a particular device.

In some embodiments, in block 308 the computing device 102 may restrict the input text to a conversation with a single user selected from multiple users of the computing device 102. In those embodiments, the computing device 102 may have multiple audio sensors 132 or otherwise be capable of interacting with multiple users simultaneously and thus may process each conversation separately. In some embodiments, in block 310 the computing device 102 may receive non-textual input data along with the input text. For example, the computing device 102 may receive camera data or other data indicative of the user of the computing device 102. As described further below, the non-textual data may be used to match against the language model 210 and/or the update the context model 214.

As described above, the method 300 begins with blocks 302, 312 executed in parallel. In block 312, the computing device 102 updates the current context model 214 based on the status of the home automation system. The computing device 102 may update the context model 214 in response to data received from one or more home automation devices 106. The computing device 102 may receive asynchronous updates from the home automation devices 106, poll the home automation devices 106, or perform any other appropriate technique for determining the status of the home automation system.

In some embodiments, in block 314 the computing device 102 updates device and/or device state data in the context model 214. For example, the computing device 102 may update the context model 214 to identify the home automation devices 106 that are currently available in the system 100. As another example, the computing device 102 may update the context model 214 to identify device states associated with the home automation devices 106. Continuing that example, the computing device 102 may update the context model 214 to indicate the current temperature set point of a particular thermostat, whether particular light switches are on or off, the setting of particular light dimmers, or other device state information. In some embodiments, in block 316 the computing device 102 may update the context model 214 to identify a location of the user. The computing device 102 may determine the location of the user, for example, based on sensor data such as camera data, motion sensor data, or other sensor data.

Although illustrated as executing blocks 302, 312 in parallel, it should be understood that in some embodiments the computing device 102 may execute those functions in at different times or in different orders. For example, in some embodiments the computing device 102 may execute blocks 302, 312 sequentially. Additionally or alternatively, in some embodiments the computing device 102 may execute block 312 asynchronously, for example updating the context model 214 based on the state of the home automation system. After receiving input text in block 302 and/or updating the context model 214 in block 312, the method 300 proceeds to block 318.

In block 318, the computing device 102 matches the input text against dialog patterns defined in the language model 210 to identify a matching pattern. As described above, the language model 210 includes a collection of patterns arranged hierarchically to define one or more dialogs. The patterns may be embodied as, for example, one or more regular-expression-like script language statements in a language such as ChatScript. As an example, a pattern such as "(!not !~state !~location [lights it] ~dark)" may match any sentence that does not contain "not," "don't," "on," "off," or a specific room in the house and does contain either a word for "lights" or "it," followed by a word that implies dimming the lights. That pattern would match inputs such as "Turn the lights down," "Make it dimmer," and "Set the lights to dark."

Each pattern may be associated with a home automation command and one or more associated parameters of the home automation command. Each parameter may correspond to particular matching words, phrases, or other values of the input text. Parameters of the command may include any data necessary to perform the command, including parameters identifying the specified home automation devices 106, requested device states, and/or locations. Each pattern may also be associated with one or more responses, including text responses. In some embodiments, in block 320 the computing device 102 may match and identify values for location, home automation device 106, and/or device state in the input text. For example, given the input text "Please flip on the kitchen lights," the computing device 102 may determine the location to be "kitchen," the home automation devices 106 to be "lights," and the device state to be "on." The computing device 102 may partially match the input text to the parameters of a home automation command—for example, the computing device 102 may not identify matches for location, device, and/or device state in the input text.

In block 322, the computing device 102 updates conversation context data of the context model 214 based on the input text and the matching pattern. The computing device 102 may update the context model 214 to identify the object, location, and/or state change requested in the current conversation. For example, the context model 214 may be updated with values matched the input text for location, home automation device 106, and/or device state. In some embodiments, the computing device 102 may age the context model 214 to eliminate older data or other data not relevant to the current conversation. For example, the computing device 102 may clear data in the context model 214 after a predetermined time period has elapsed, after the computing device 102 determines that the current conversation has ended, or after any other appropriate event.

In block 324, the computing device 102 resolves potential ambiguities or missing parameters in the requested home automation command using the current context model 214. In other words, the computing device 102 may determine one or more parameters of the home automation command based on values selected from the current context model 214. In some embodiments, in block 326 the computing device 102 may supply the location, home automation device 106, and/or device state from conversation context data of the context model 214. For example, if the input text is "turn the lights on," the location of the home automation command (e.g., the particular room having the lights) may be ambiguous. In that example, the computing device 102 may determine whether the context model 214 identifies a location associated with the current conversation. In some embodiments, in block 328, the computing device 102 may supply the location from user context data of the context model 214. For example, if the input text is "turn the lights on," the computing device 102 may identify the location as the room of the user's current location based on the context model 214. In some embodiments, in block 330 the computing device 102 may supply the home automation device 106 and/or device state from device context data of the context model 214. For example, if the input text is "turn the kitchen lights on," the computing device 102 may identify the particular home automation devices 106 used to control the kitchen lights based on the available home automation devices 106 described in the context model 214. As another example, if the input text is "toggle the lights," the computing device 102 may determine the device state (e.g., on or off) based on the current device state described in the context model 214.

In block 332, shown in FIG. 3B, the computing device 102 determines whether the home automation command is sufficiently resolved. The computing device 102 may determine, for example, whether the parameters of the home automation command have been disambiguated or otherwise resolved sufficiently to allow the home automation command to be executed. In some embodiments, in block 334 the computing device 102 may determine whether a location (e.g., a room within the home), a home automation device 106, and a requested device state have been identified for the home automation command. In block 336, the computing device 102 checks whether the home automation command has been resolved. If the command has been resolved, the method 300 branches ahead to block 340, described below. If the command has not been resolved, the method 300 advances to block 338.

In block 338, the computing device 102 generates a follow-up question for the response. The follow-up question may be embodied as any natural language response that prompts the user to supply additional information that may be used to resolve the home automation command. The computing device 102 may determine the follow-up question using the language model 210. For example, the language model 210 may include one or more predefined follow-up questions associated with the current pattern matching the input text. For example, if the input text is "turn on the lights," and the computing device 102 cannot resolve the location of the lights based on the context model 214, the follow-up question may be embodied as, "Which lights do you mean?" After generating the follow-up question for the response, the method 300 branches ahead to block 350 to present the response to the user, as described further below.

Referring back to block 336, if the home automation command is sufficiently resolved, the method 300 branches ahead to block 340, in which the computing device 102 determines whether the home automation command is consistent with the current device state stored in the context model 214 or otherwise valid. For example, if the input text is "turn on the kitchen lights," the computing device 102 may determine whether the kitchen lights are currently turned off (i.e., that the request to turn on the kitchen lights is consistent with their current state of being turned off and therefore valid). In block 342, the computing device 102 checks whether the command is valid. If so, the method 300 branches ahead to block 346 as described further below. If the command is not valid, the method 300 advances to block 344, in which the computing device 102 generates an error message for the response. After generating the error message for the response, the method 300 branches ahead to block 350 to present the response to the user, as described further below.

Referring back to block 342, if the command is valid, the method 300 branches to block 346, in which the computing device 102 generates response text based on the language model 210. The response text may be embodied as any natural language response that acknowledges or otherwise confirms that the user request has been successfully processed. The computing device 102 may determine the response using the language model 210. For example, the language model 210 may include one or more predefined responses associated with the current pattern matching the input text. For example, the response may be embodied as "OK, I turned the lights on," or simply, "OK."

In block 348, the computing device 102 generates a home automation command based on the language model 210. The home automation command may be embodied as any command, query, or other action that may be performed using one or more of the home automation devices 106. In particular, the home automation command may identify particular locations within the home, particular home automation devices 106, and/or particular requested device states of the home automation devices 106. For example, the home automation command may adjust lighting in particular rooms of the home, adjust the temperature, humidity, or other climate control settings in particular rooms of the home, activate or deactivate appliances or other equipment in the home, activate or query motion sensors, cameras, locks, or other security systems, or otherwise control the home automation devices 106. Similar to the response text, the computing device 102 may generate the home automation command using the language model 210. For example, the language model 210 may include one or more predefined home automation commands associated with the pattern matching the current input text. The home automation command may be adjusted using parameters and other values included in the input text and/or determined based on the context model 214, as described above.

In block 350, the computing device 102 presents the response text to the user. For example, the computing device 102 may present a follow-up question, an error message, or a successful response as described above in connection with blocks 338, 344, 346, respectively. The computing device 102 may use any technique for presenting the response text to the user, including displaying the response text on a display screen. In some embodiments, in block 352 the computing device 102 may perform the home automation command determined as described above in connection with block 348. The computing device 102 may, for example, send the home automation command to the home automation controller 104 and/or to one or more home automation devices 106. By performing the home automation command, the computing device 102 executes the action requested by the user in the input text. In some embodiments, in block 354 the computing device 102 outputs the response text using a text-to-speech synthesizer. Thus, by receiving speech input and outputting a speech response, the computing device 102 may allow conversational speech control of the home automation system. Additionally, although illustrated as generating response text for each command, it should be understood that in some embodiments the computing device 102 may "silently" perform the home automation command without generating response text or presenting any response text to the user. After presenting the response to the user, the method 300 loops back to blocks 302, 312 shown in FIG. 3A to continue processing input text.

Figure 4:
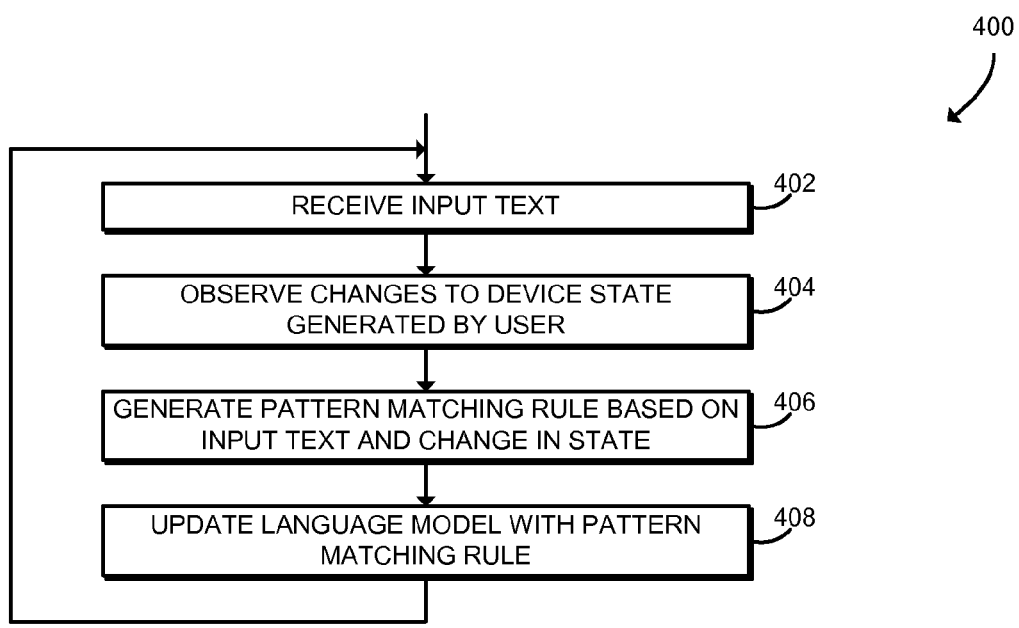
FIG. 4 is a simplified flow diagram of at least one embodiment of a method for dialog pattern learning that may be executed by the computing device of FIGS. 1 and 2.

Referring now to FIG. 4, in some embodiments the computing device 102 may execute a method 400 for dialog pattern learning. The method 400 begins with block 402, in which the computing device 102 receives input text from a user of the computing device 102. As described above in connection with block 302 of FIG. 3A, the input text may be indicative of a spoken user request. The user request may include part or all of a home automation system command, including one or more parameters associated with the home automation system command or query. The computing device 102 may receive the input text, for example, from an automated speech recognition system.

In block 404, the computing device 102 observes changes to the device state of one or more home automation devices 106 generated in response to the user request. In some embodiments, the computing device 102 may perform learning by example. In those embodiments, the user may manually change the device state, for example by operating manual controls of one or more home automation devices 106. For example, the computing device 102 may be placed into a learning by example mode, and the computing device 102 may observe as the user operates lights, climate control systems, or other home automation devices 106. As another example, the computing device 102 may observe the changes caused by a home automation command executed as described above in connection with the method 300 of FIGS. 3A and 3B.

In block 406, the computing device 102 generates a pattern matching rule based on the input text and the observed change in state. The pattern matching rule may associate the particular names, phrasing, or other individualized language that the user associates with a particular location, device, and/or device state. For example, when in the learning mode, the input text may be "I am turning on the kitchen lights," and the computing device 102 may associate the word "kitchen" with the location of the home automation devices 106 operated by the user. As another example, the input text may be "flip on the lights," and the home automation command may result in the lights being turned on, for example after presenting one or more follow-up questions to the user. In that example, the computing device 102 may respond with a follow-up question such as, "I don't understand, can you rephrase the request," and the user may respond, "Turn on the lights." In that example, the computing device 102 may generate a pattern matching the original input text "flip on the lights" that is associated with controlling the home automation devices 106 to turn on the lights.

In block 408, the computing device 102 updates the language model 210 with the pattern matching rule generated in block 406. Thus, the computing device 102 may adapt to the speech patterns of a particular user. After updating the language model 210, the method 400 loops back to block 402 to continue learning dialog patterns.

Figure 5:
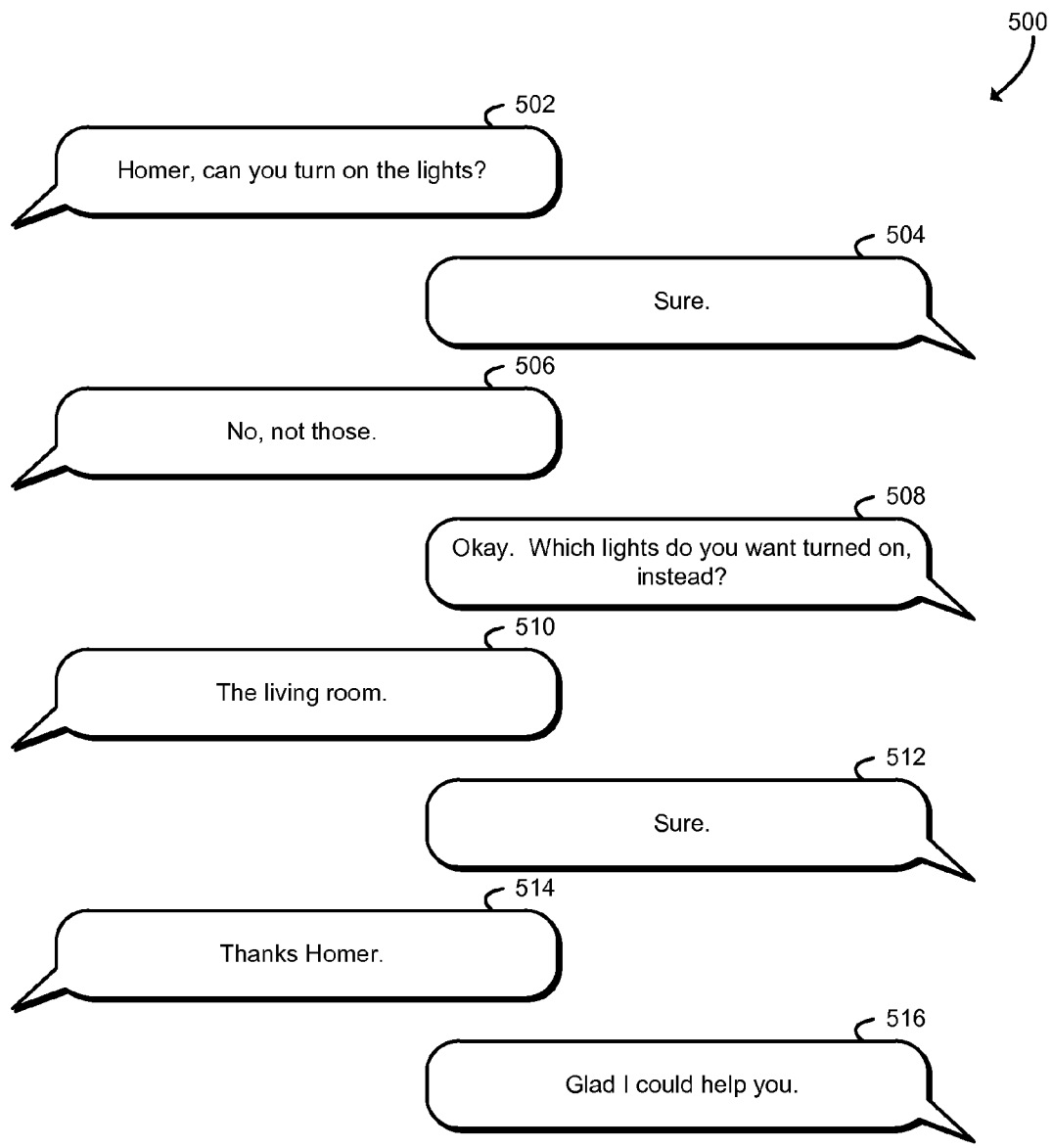
FIG. 5 is a schematic diagram illustrating a conversational dialog that may be executed by the computing device of FIGS. 1 and 2.

Referring now to FIG. 5, schematic diagram 500 illustrates a sample home automation control conversational dialog that may be executed by the computing device 102. The conversation starts with the user speaking input text 502, "Homer, can you turn on the lights?" Note that the input text 502 starts with an illustrative control word "Homer," which the computing device 102 may use to gate the speech input. The computing device 102 processes the input text 502 and may determine that the input text matches a command to turn on lights, but that the input text does not include a location of the lights. As described above, the computing device 102 may determine the location of the lights based on the context model 214. In the illustrative embodiment, the computing device 102 determines that the user has requested to turn on the kitchen lights based on the location of the user. The computing device 102 turns on the kitchen lights by controlling the appropriate home automation devices 106. The computing device 102 generates the response text 504, "Sure," to indicate that the user request has been successfully processed.

The user next speaks input text 506, "No, not those." The computing device 102 may determine using the context model 214 that the word "those" refers to the kitchen lights, which are the subject of the current conversation. The computing device 102 turns off the kitchen lights by controlling the appropriate home automation devices 106, and generates the response text 508, "Okay. Which lights do you want turned on, instead?" The response text 508 thus may act as a follow-up question to determine the location of the lights in the original user request.

The user next speaks input text 510, "The living room." The computing device 102 may identify that the input text 510 includes a location, and may supply the rest of the home automation command (e.g., the requested devices and device state) based on the context model 214. Thus, the computing device 102 turns on the lights in the living room by controlling the appropriate home automation devices 106, and generates the response text 512, "Sure," to indicate that the user request has been successfully processed.

The user next speaks input text 514, "Thanks Homer." Note that the input text 514 does not include a home automation command. However, the language model 210 may include one or more patterns matching common conversational words and phrases such as "Thanks." Thus, in the illustrative embodiment the computing device 102 matches the input text 514 and then generates response text 516, "Glad I could help you."

Figure 6:
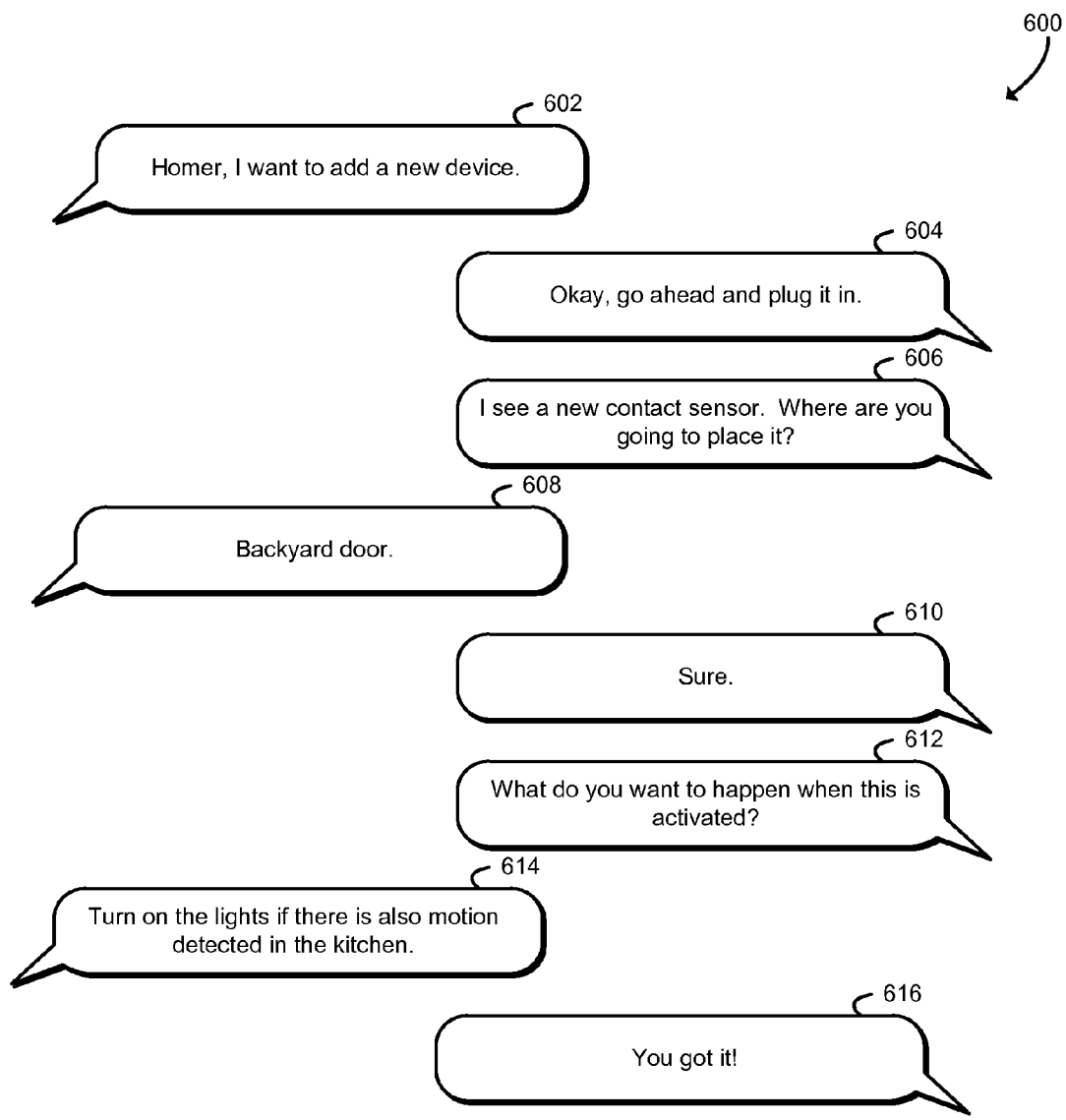
FIG. 6 is a schematic diagram illustrating another conversational dialog that may be executed by the computing device of FIGS. 1 and 2.

Referring now to FIG. 6, schematic diagram 600 illustrates another sample home automation control conversational dialog that may be executed by the computing device 102. The diagram 600 illustrates configuration of a home automation system using the computing device 102. The conversation starts with the user speaking input text 602, "Homer, I want to add a new device." The computing device 102 processes the input text 602 and then puts the home automation system into a pairing mode or otherwise searches for a new home automation device 106. The computing device 102 further generates response text 604, "Okay, go ahead and plug it in."

In response to the response text 604, the user activates a new home automation device 106. In the illustrative embodiment, the home automation device 106 is a contact sensor that may be used with the security system 112. The home automation device 106 and/or the computing device 102 updates the context model 214 to indicate that the new home automation device 106 has been added to the home automation system. In response to the change to the context model 214, the computing device 102 generates response text 606, "I see a new contact sensor. Where are you going to place it?" Note that the computing device 102 may generate the response text 606 in response to a change to the context model 214 and not directly in response to speech input from the user.

The user next speaks input text 608, "Backyard door." The computing device 102 may identify that the input text 608 includes a location and may supply the rest of the home automation command (e.g., the device and/or requested device state) from the context model 214. In response to the input text 608, the computing device 102 configures the new home automation device 106 and/or the context model 214 of the computing device 102 based on the location provided by the user. The computing device 102 generates the response text 610, "Sure," to indicate that the user request has been successfully processed.

Next, the computing device 102 generates response text 612, "What do you want to happen when this is activated?" In some embodiments, the computing device 102 may generate the response text 612 based on the language model 210. For example, the response text 612 may be part of a predefined dialog used for configuring new home automation devices 106. In some embodiments, the computing device 102 may generate the response text 612 based on the state of the home automation system. For example, the computing device 102 may determine that the new home automation device 106 does not have an associated action and then generate the response text 612 based on that determination.

The user next speaks input text 614, "Turn on the lights if there is also motion detected in the kitchen." The computing device 102 processes the input text 614 and then programs a corresponding rule for turning on the lights. For example, the computing device 102 may transmit a command or otherwise control the home automation controller 104 and/or one or more appropriate home automation devices 106 to program the rule. In response to the input text 614, the computing device 102 generates response text 616, "You got it!" to indicate that the user request has been successfully processed.

Figure 7:
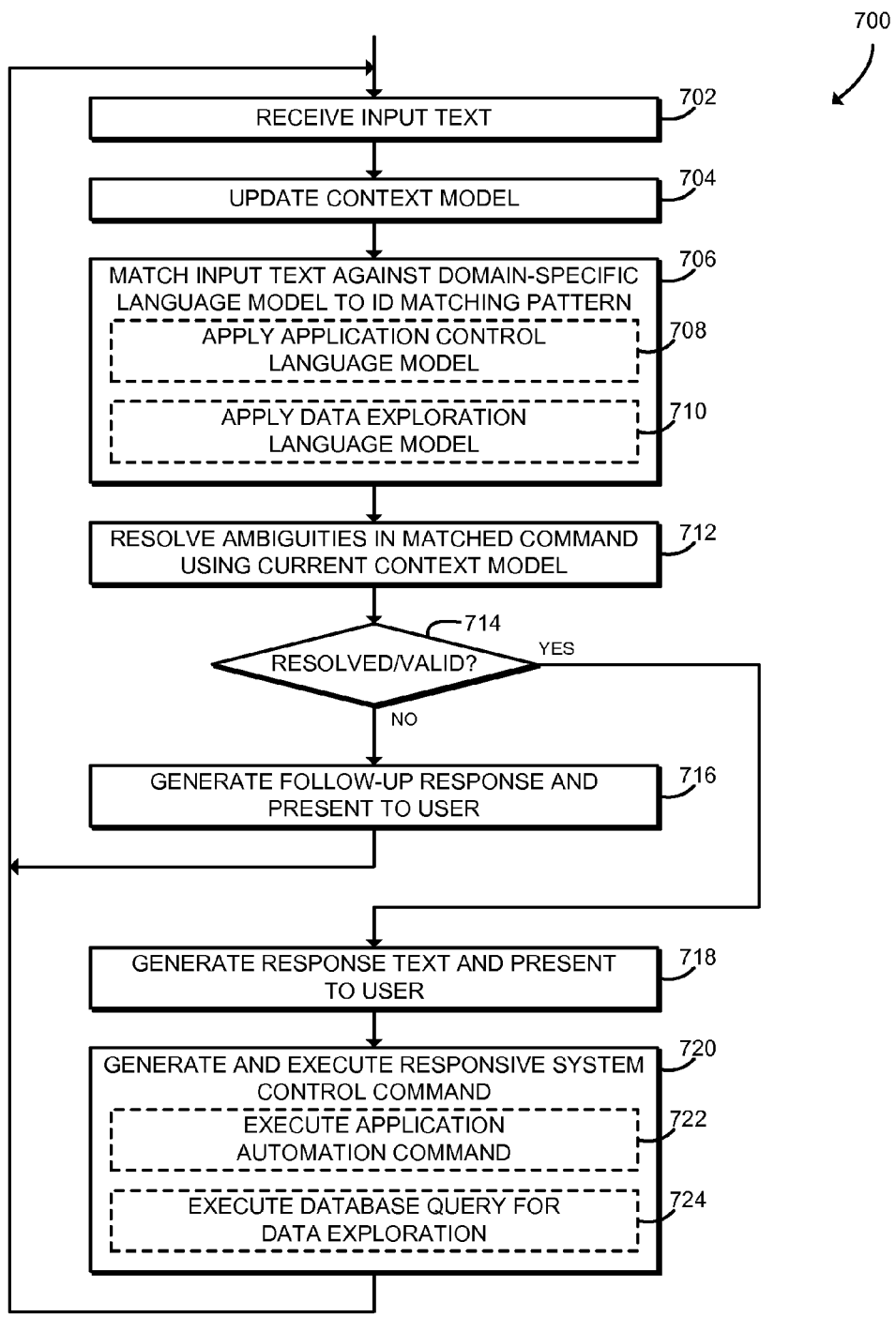
FIG. 7 is a simplified flow diagram of at least one embodiment of a method for conversational control of a system that may be executed by the computing device of FIGS. 1 and 2.

Referring now to FIG. 7, in use, the computing device 102 may execute a method 700 for conversational control of a system. The method 700 begins with block 702, in which the computing device 102 receives input text from a user of the computing device 102. The input text may be indicative of a spoken user request. The user request may include part or all of a system control command, including one or more parameters relating to the system control command or query. The system control command may relate to any system or systems controlled by the computing device 102, such as a home automation system (as described above in connection with FIGS. 3A, 3B and 4), an application automation system, a data exploration system, or other system. The input text is a natural language request and thus may not conform to any particular predefined format or syntax.

In block 704, the computing device 102 updates the context model 214 based on the current state of the system being controlled. The computing device 102 may use any technique to determine the current state of the system, for example receiving asynchronous updates from the system and/or polling the system. Additionally, although illustrated as updating the context model 214 sequentially as part of the method 700, it should be understood that the computing device 102 may update the context model 214 asynchronously or at any other appropriate time.

In block 706, the computing device 102 matches the input text against dialog patterns defined in a domain-specific language model 210 to identify a matching pattern. As described above, the language model 210 includes a collection of patterns arranged hierarchically to define one or more dialogs. The patterns may be embodied as, for example, one or more regular-expression-like script language statements in a language such as ChatScript. The language model 210 may include patterns relating to the vocabulary, available system control commands, and other attributes of the particular domain. In some embodiments, in block 708 the computing device 102 may apply an application control language model 210. The application control language model 210 may include dialog patterns and dictionaries relating to application automation commands, such as commands corresponding to user interface items such as buttons and menu items, as well as commands without a corresponding user interface item (e.g., complicated selections, compound commands, etc.). In some embodiments, in block 710, the computing device 102 may apply a data exploration language model 210. The data exploration language model 210 may include dialog patterns and dictionaries relating to a particular data set, including potential queries of the dataset, available tables and data items in the data set, and other attribute of the data set. Parameters of the system control commands may include, for example, variables for comparison and selection of data records, filter commands, relational commands such as joins, aggregations, and other relational commands.

In block 712, the computing device 102 resolves potential ambiguities or missing parameters in the requested system control command using the current context model 214. In other words, the computing device 102 may determine one or more parameters of the system control command based on values selected from the current context model 214. The context model 214 may include conversational context data relating to the content of the current conversation, such as previous user requests and responses. In some embodiments, the context model 214 may include context data relating to the system being controlled. For example, for use with an application control system, the context model 214 may include data relating to the current context of the application, such as open files, the current view, recent commands, or other application context. As another example, for use with a data exploration system, the context model 214 may include parameters or other data relating to previous queries. In block 714, the computing device 102 determines whether the system control command is sufficiently resolved and valid. The system control command may be sufficiently resolved, for example, if the computing device 102 may generate a complete system control command based on the known parameters of the system control command. The system control command may be valid, for example, if the system control command is consistent with the system state described in the current context model 214. If the command is resolved and valid, the method 700 branches ahead to block 718, described below. If the command is not resolved and/or valid, the method 700 advances to block 716.

In block 716, the computing device 102 generates a follow-up response and presents the follow-up response to the user. The computing device 102 may present the follow-up response using any appropriate technique, for example, by displaying the follow-up response on a display screen or by using a text-to-speech synthesizer. The follow-up response may be embodied as, for example, a follow-up question that prompts the user to supply additional information that may be used to resolve the system control command. As another example, the follow-up response may be embodied as an error message if the system control command is not valid. The computing device 102 may determine the follow-up response using the language model 210. For example, the language model 210 may include one or more predefined follow-up responses associated with the current pattern matching the input text. After generating and presenting the follow-up response, the method 700 loops back to block 702 to continue processing input text.

Referring back to block 714, if the system control command is sufficiently resolved and valid, the method 700 branches to block 718, in which the computing device 102 generates response text and presents the response text to the user. The response text may be embodied as any natural language response that acknowledges or otherwise confirms that the user request has been successfully processed. The computing device 102 may determine the response using the language model 210. For example, the language model 210 may include one or more predefined responses associated with the current pattern matching the input text. The computing device 102 may use any technique for presenting the response text to the user, including displaying the response text on a display screen or outputting the response text using a text-to-speech synthesizer.

In block 720, the computing device 102 generates and executes a system control command determined based on the language model 210. The system control command may be embodied as any command, query, or other action that may be performed using the system controlled by the computing device 102. Similar to the response text, the computing device 102 may generate the system control command using the language model 210. For example, the language model 210 may include one or more predefined system control commands associated with patterns matching the input text. The home automation command may be adjusted using parameters and other values included in the input text and/or determined based on the context model 214, as described above.

In some embodiments, in block 722 the computing device 102 may execute an application automation command. The application automation command may be embodied as any script, program, macro, or other command that may control one or more applications executed by the computing device 102. For example, the application automation command may be embodied as a Microsoft® Office Interop API command, an AppleScript™ command, a JavaScript™ command, or other application scripting command. In some embodiments, in block 724, the computing device 102 may execute a database query for data exploration. The database query may be embodied as any database query, filter, or other command relating to the data set associated with the language model 210. After executing the system control command, the method 700 loops back to block 702 to continue processing input text.

Although illustrated as performing home automation, application automation, and data exploration control, it should be understood that in some embodiments the system 100 may control other devices or collections of devices. For example, in some embodiments, the system 100 may be used to provide conversational control of devices participating in a local Internet of Things (IoT).

EXAMPLES

Illustrative examples of the devices, systems, and methods disclosed herein are provided below. An embodiment of the devices, systems, and methods may include any one or more, and any combination of, the examples described below.

Example 1 includes a computing device for conversational system control, the computing device comprising a controller module to receive input text indicative of a spoken user request, wherein the spoken user request includes one or more parameters associated with a system control command; a conversational interface module to match the input text against a language model to identify a matching pattern, wherein the language model includes a plurality of patterns and wherein the matching pattern is associated with the system control command; and a context management module to determine one or more of the parameters of the system control command based on a context model in response to a match of the input text; wherein the conversational interface module is further to generate the system control command based on the language model in response to a determination of the one or more parameters; and wherein the controller module is further to perform the system control command.

Example 2 includes the subject matter of Example 1, and wherein the matching pattern is further associated with text response; the conversational interface module is further to generate the text response based on the language model; and the controller module is further to present the text response to a user of the computing device.

Example 3 includes the subject matter of any of Examples 1 and 2, and further including an automated speech recognition module to perform automated speech recognition to generate the input text; and a text-to-speech module to generate speech output based on the text response with a text-to-speech engine.

Example 4 includes the subject matter of any of Examples 1-3, and wherein to perform the automated speech recognition comprises to perform the automated speech recognition in response to detection of a control word.

Example 5 includes the subject matter of any of Examples 1-4, and wherein the context management module is further to update the context model based on the input text in response to the match of the input text.

Example 6 includes the subject matter of any of Examples 1-5, and wherein the conversational interface module is further to (i) determine whether the system control command is sufficiently resolved in response to the determination of the one or more parameters of the system control command and (ii) generate a follow-up question for the text response with the language model in response to a determination that the system control command is not sufficiently resolved; wherein to generate the system control command based on the language model comprises to generate the system control command in response to a determination that the system control command is sufficiently resolved.

Example 7 includes the subject matter of any of Examples 1-6, and wherein the system control command comprises a home automation command; the one or more parameters of the home automation command include a location, a device, or a requested device state; and the context model includes conversational context data, user context data, and home automation device context data.

Example 8 includes the subject matter of any of Examples 1-7, and wherein to determine the one or more of the parameters of the home automation command based on the context model comprises to determine a location parameter, a device parameter, or a device state parameter of the home automation command based on the conversational context data.

Example 9 includes the subject matter of any of Examples 1-8, and wherein to determine the one or more of the parameters of the home automation command based on the context model comprises to determine a location parameter of the home automation command based on the user context data.

Example 10 includes the subject matter of any of Examples 1-9, and wherein to determine the one or more of the parameters of the home automation command based on the context model comprises to determine a device parameter or a device state parameter of the home automation command based on the home automation device context data.

Example 11 includes the subject matter of any of Examples 1-10, and wherein the context management module is further to update the context model based on data received from a home automation system.

Example 12 includes the subject matter of any of Examples 1-11, and wherein to update the context model based on the data received from the home automation system comprises to update the home automation device context data based on device data or device state data received from the home automation system.

Example 13 includes the subject matter of any of Examples 1-12, and wherein the context management module is further to update the context model based on location data associated with a user of the computing device.

Example 14 includes the subject matter of any of Examples 1-13, and, wherein the controller module is further to determine whether the home automation command is valid based on the home automation device context data of the context model in response to the determination of the one or more parameters of the home automation command; and the conversational interface module is to generate an error message for the text response with the language model in response to a determination that the home automation command is not valid; wherein to generate the system control command based on the language model comprises to generate the home automation command in response to a determination that the home automation command is valid.

Example 15 includes the subject matter of any of Examples 1-14, and further including a learning module to observe a change in device state of a home automation system in response to performance of the home automation command; generate a new pattern based on the input text, wherein the pattern is associated with the home automation command; and update the language model to include the new pattern.

Example 16 includes the subject matter of any of Examples 1-15, and wherein to receive the input text indicative of the spoken user request comprises to restrict the input text to a conversation with a single user selected from a plurality of users.

Example 17 includes the subject matter of any of Examples 1-16, and wherein the controller module is further to receive non-textual input data indicative of a user request; and the conversational interface module is further to match the non-textual input data against the language model to identify the matching pattern.

Example 18 includes the subject matter of any of Examples 1-17, and wherein the system control command comprises an application control command; the one or more parameters of the application control command include an application user command or an application object; and the context model includes conversational context data and application context data.

Example 19 includes the subject matter of any of Examples 1-18, and wherein the system control command comprises a data exploration command; the one or more parameters of the data exploration command include a data query parameter; and the context model includes conversational context data and query context data.

Example 20 includes a method for conversational system control, the method comprising receiving, by a computing device, input text indicative of a spoken user request, wherein the spoken user request includes one or more parameters associated with a system control command; matching, by the computing device, the input text against a language model to identify a matching pattern, wherein the language model includes a plurality of patterns and wherein the matching pattern is associated with the system control command; determining, by the computing device, one or more of the parameters of the system control command using a context model in response to matching the input text; generating, by the computing device, the system control command using the language model in response to determining the one or more parameters; and performing, by the computing device, the system control command.

Example 21 includes the subject matter of Example 20, and further including generating, by the computing device, a text response using the language model in response to determining the one or more parameters, wherein the matching pattern is associated with the text response; and presenting, by the computing device, the text response to a user of the computing device.

Example 22 includes the subject matter of any of Examples 20 and 21, and further including performing, by the computing device, automated speech recognition to generate the input text; and generating, by the computing device, speech output based on the text response using a text-to-speech engine.

Example 23 includes the subject matter of any of Examples 20-22, and wherein performing the automated speech recognition comprises performing the automated speech recognition in response to detecting a control word.

Example 24 includes the subject matter of any of Examples 20-23, and further including updating, by the computing device, the context model based on the input text in response to matching the input text.

Example 25 includes the subject matter of any of Examples 20-24, and further including determining, by the computing device, whether the system control command is sufficiently resolved in response to determining the one or more parameters of the system control command; and generating, by the computing device, a follow-up question for the text response using the language model in response to determining that the system control command is not sufficiently resolved; wherein generating the system control command based on the language model comprises generating the system control command in response to determining that the system control command is sufficiently resolved.

Example 26 includes the subject matter of any of Examples 20-25, and wherein the system control command comprises a home automation command; the one or more parameters of the home automation command include a location, a device, or a requested device state; and the context model includes conversational context data, user context data, and home automation device context data.

Example 27 includes the subject matter of any of Examples 20-26, and wherein determining the one or more of the parameters of the home automation command using the context model comprises determining a location parameter, a device parameter, or a device state parameter of the home automation command based on the conversational context data.

Example 28 includes the subject matter of any of Examples 20-27, and wherein determining the one or more of the parameters of the home automation command using the context model comprises determining a location parameter of the home automation command based on the user context data.

Example 29 includes the subject matter of any of Examples 20-28, and wherein determining the one or more of the parameters of the home automation command using the context model comprises determining a device parameter or a device state parameter of the home automation command based on the home automation device context data.

Example 30 includes the subject matter of any of Examples 20-29, and further including updating, by the computing device, the context model based on data received from a home automation system.

Example 31 includes the subject matter of any of Examples 20-30, and wherein updating the context model based on the data received from the home automation system comprises updating the home automation device context data based on device data or device state data received from the home automation system.

Example 32 includes the subject matter of any of Examples 20-31, and further including updating, by the computing device, the context model based on location data associated with a user of the computing device.

Example 33 includes the subject matter of any of Examples 20-32, and further including determining, by the computing device, whether the home automation command is valid based on the home automation device context data of the context model in response to determining the one or more parameters of the home automation command; and generating, by the computing device, an error message for the text response using the language model in response to determining that the home automation command is not valid; wherein generating the system control command based on the language model comprises generating the home automation command in response to determining that the home automation command is valid.

Example 34 includes the subject matter of any of Examples 20-33, and further including observing, by the computing device, a change in device state of a home automation system in response to performing the home automation command; generating, by the computing device, a new pattern based on the input text, wherein the pattern is associated with the home automation command; and updating, by the computing device, the language model to include the new pattern.

Example 35 includes the subject matter of any of Examples 20-34, and wherein receiving the input text indicative of the spoken user request comprises restricting the input text to a conversation with a single user selected from a plurality of users.

Example 36 includes the subject matter of any of Examples 20-35, and, further including receiving, by the computing device, non-textual input data indicative of a user request; and matching, by the computing device, the non-textual input data against the language model to identify the matching pattern.

Example 37 includes the subject matter of any of Examples 20-36, and wherein the system control command comprises an application control command; the one or more parameters of the application control command include an application user command or an application object; and the context model includes conversational context data and application context data.

Example 38 includes the subject matter of any of Examples 20-37, and wherein the system control command comprises a data exploration command; the one or more parameters of the data exploration command include a data query parameter; and the context model includes conversational context data and query context data.

Example 39 includes a computing device comprising a processor; and a memory having stored therein a plurality of instructions that when executed by the processor cause the computing device to perform the method of any of Examples 20-38.

Example 40 includes one or more machine readable storage media comprising a plurality of instructions stored thereon that in response to being executed result in a computing device performing the method of any of Examples 20-38.

Example 41 includes a computing device comprising means for performing the method of any of Examples 20-38.

Example 42 includes a computing device for conversational system control, the computing device comprising means for receiving input text indicative of a spoken user request, wherein the spoken user request includes one or more parameters associated with a system control command; means for matching the input text against a language model to identify a matching pattern, wherein the language model includes a plurality of patterns and wherein the matching pattern is associated with the system control command; means for determining one or more of the parameters of the system control command using a context model in response to matching the input text; means for generating the system control command using the language model in response to determining the one or more parameters; and means for performing the system control command.

Example 43 includes the subject matter of Example 42, and further comprising means for generating a text response using the language model in response to determining the one or more parameters, wherein the matching pattern is associated with the text response; and means for presenting the text response to a user of the computing device.

Example 44 includes the subject matter of any of Examples 42 and 43, and further including means for performing automated speech recognition to generate the input text; and means for generating speech output based on the text response using a text-to-speech engine.

Example 45 includes the subject matter of any of Examples 42-44, and wherein the means for performing the automated speech recognition comprises means for performing the automated speech recognition in response to detecting a control word.

Example 46 includes the subject matter of any of Examples 42-45, and further including means for updating the context model based on the input text in response to matching the input text.

Example 47 includes the subject matter of any of Examples 42-46, and further including means for determining whether the system control command is sufficiently resolved in response to determining the one or more parameters of the system control command; and means for generating a follow-up question for the text response using the language model in response to determining that the system control command is not sufficiently resolved; wherein the means for generating the system control command based on the language model comprises means for generating the system control command in response to determining that the system control command is sufficiently resolved.

Example 48 includes the subject matter of any of Examples 42-47, and wherein the system control command comprises a home automation command; the one or more parameters of the home automation command include a location, a device, or a requested device state; and the context model includes conversational context data, user context data, and home automation device context data.

Example 49 includes the subject matter of any of Examples 42-48, and wherein the means for determining the one or more of the parameters of the home automation command using the context model comprises means for determining a location parameter, a device parameter, or a device state parameter of the home automation command based on the conversational context data.

Example 50 includes the subject matter of any of Examples 42-49, and wherein the means for determining the one or more of the parameters of the home automation command using the context model comprises means for determining a location parameter of the home automation command based on the user context data.

Example 51 includes the subject matter of any of Examples 42-50, and wherein the means for determining the one or more of the parameters of the home automation command using the context model comprises means for determining a device parameter or a device state parameter of the home automation command based on the home automation device context data.

Example 52 includes the subject matter of any of Examples 42-51, and further including means for updating the context model based on data received from a home automation system.

Example 53 includes the subject matter of any of Examples 42-52, and wherein the means for updating the context model based on the data received from the home automation system comprises means for updating the home automation device context data based on device data or device state data received from the home automation system.

Example 54 includes the subject matter of any of Examples 42-53, and further including means for updating the context model based on location data associated with a user of the computing device.

Example 55 includes the subject matter of any of Examples 42-54, and further including means for determining whether the home automation command is valid based on the home automation device context data of the context model in response to determining the one or more parameters of the home automation command; and means for generating an error message for the text response using the language model in response to determining that the home automation command is not valid; wherein the means for generating the system control command based on the language model comprises means for generating the home automation command in response to determining that the home automation command is valid.

Example 56 includes the subject matter of any of Examples 42-55, and further including means for observing a change in device state of a home automation system in response to performing the home automation command; means for generating a new pattern based on the input text, wherein the pattern is associated with the home automation command; and means for updating the language model to include the new pattern.

Example 57 includes the subject matter of any of Examples 42-56, and wherein the means for receiving the input text indicative of the spoken user request comprises means for restricting the input text to a conversation with a single user selected from a plurality of users.

Example 58 includes the subject matter of any of Examples 42-57, and further including means for receiving non-textual input data indicative of a user request; and means for matching the non-textual input data against the language model to identify the matching pattern.

Example 59 includes the subject matter of any of Examples 42-58, and wherein the system control command comprises an application control command; the one or more parameters of the application control command include an application user command or an application object; and the context model includes conversational context data and application context data.

Example 60 includes the subject matter of any of Examples 42-59, and wherein the system control command comprises a data exploration command; the one or more parameters of the data exploration command include a data query parameter; and the context model includes conversational context data and query context data.

The invention claimed is:

1. A computing device for conversational system control, the computing device comprising:
a controller module to receive input text indicative of a spoken user request, wherein the spoken user request includes one or more parameters associated with a system control command for a controlled system;
a conversational interface module to match the input text against a language model to identify a matching pattern, wherein the language model includes a plurality of dialog patterns, wherein the dialog patterns are arranged hierarchically to define one or more dialogs, and wherein each dialog pattern, when evaluated against the input text, determines whether the input text matches the corresponding dialog pattern, and wherein the matching pattern is associated with the system control command; and
a context management module to determine one or more of the parameters of the system control command based on a context model in response to a match of the input text;
wherein the conversational interface module is further to generate the system control command based on the language model in response to a determination of the one or more parameters; and
wherein the controller module is further to perform the system control command to cause a change in system state of the controlled system, wherein the controlled system comprises a home automation system, and wherein the change in the system state comprises a change in device state of a device of the home automation system, wherein the device state comprises an activation state of the device or a set point of the device;
wherein the computing device further comprises a learning module to (i) observe the change in the system state of the controlled system in response to performance of the system control command, (ii) generate a new dialog pattern based on the input text and the change in the device state, wherein the new dialog pattern is associated with the system control command, and (iii) update the language model to include the new dialog pattern.

2. The computing device of claim 1, wherein:
the matching pattern is further associated with text response;
the conversational interface module is further to generate the text response based on the language model; and
the controller module is further to present the text response to a user of the computing device.

3. The computing device of claim 1, further comprising:
an automated speech recognition module to perform automated speech recognition to generate the input text; and
a text-to-speech module to generate speech output based on the text response with a text-to-speech engine.

4. The computing device of claim 1, wherein:
the system control command comprises a home automation command;
the one or more parameters of the home automation command include a location, a device, or a requested device state; and
the context model includes conversational context data, user context data, or home automation device context data.

5. The computing device of claim 4, wherein to determine the one or more of the parameters of the home automation command based on the context model comprises to determine a location parameter, a device parameter, or a device state parameter of the home automation command based on the conversational context data.

6. The computing device of claim 4, wherein to determine the one or more of the parameters of the home automation command based on the context model comprises to determine a location parameter of the home automation command based on the user context data.

7. The computing device of claim 4, wherein to determine the one or more of the parameters of the home automation command based on the context model comprises to determine a device parameter or a device state parameter of the home automation command based on the home automation device context data.

8. The computing device of claim 4, wherein the context management module is further to update the context model based on data received from the home automation system.

9. The computing device of claim 4, wherein:
the controller module is further to determine whether the home automation command is valid based on the home automation device context data of the context model in response to the determination of the one or more parameters of the home automation command; and
the conversational interface module is to generate an error message for the text response with the language model in response to a determination that the home automation command is not valid;
wherein to generate the system control command based on the language model comprises to generate the home automation command in response to a determination that the home automation command is valid.

10. A method for conversational system control, the method comprising:
receiving, by a computing device, input text indicative of a spoken user request, wherein the spoken user request includes one or more parameters associated with a system control command for a controlled system;
matching, by the computing device, the input text against a language model to identify a matching pattern, wherein the language model includes a plurality of dialog patterns, wherein the dialog patterns are arranged hierarchically to define one or more dialogs, and wherein each dialog pattern, when evaluated against the input text, determines whether the input text matches the corresponding dialog pattern, and wherein the matching pattern is associated with the system control command;
determining, by the computing device, one or more of the parameters of the system control command using a context model in response to matching the input text;
generating, by the computing device, the system control command using the language model in response to determining the one or more parameters;
performing, by the computing device, the system control command to cause a change in system state of the controlled system, wherein the controlled system comprises a home automation system, and wherein the change in the system state comprises a change in device state of a device of the home automation system, wherein the device state comprises an activation state of the device or a set point of the device;

observing, by the computing device, the change in the system state of the controlled system in response to performing the system control command;

generating, by the computing device, a new dialog pattern based on the input text and the change in the system state, wherein the new dialog pattern is associated with the system control command; and updating, by the computing device, the language model to include the new dialog pattern.

11. The method of claim 10, further comprising:

generating, by the computing device, a text response using the language model in response to determining the one or more parameters, wherein the matching pattern is associated with the text response; and presenting, by the computing device, the text response to a user of the computing device.

12. The method of claim 10, wherein:

the system control command comprises a home automation command;

the one or more parameters of the home automation command include a location, a device, or a requested device state; and the context model includes conversational context data, user context data, or home automation device context data.

13. The method of claim 12, further comprising:

determining, by the computing device, whether the home automation command is valid based on the home automation device context data of the context model in response to determining the one or more parameters of the home automation command; and generating, by the computing device, an error message for the text response using the language model in response to determining that the home automation command is not valid;

wherein generating the system control command based on the language model comprises generating the home automation command in response to determining that the home automation command is valid.

14. One or more non-transitory, computer-readable storage media comprising a plurality of instructions that in response to being executed cause a computing device to:

receive input text indicative of a spoken user request, wherein the spoken user request includes one or more parameters associated with a system control command for a controlled system;

match the input text against a language model to identify a matching pattern, wherein the language model includes a plurality of dialog patterns, wherein the dialog patterns are arranged hierarchically to define one or more dialogs, and wherein each dialog pattern, when evaluated against the input text, determines whether the input text matches the corresponding dialog pattern, and wherein the matching pattern is associated with the system control command;

determine one or more of the parameters of the system control command using a context model in response to matching the input text;

generate the system control command using the language model in response to determining the one or more parameters;

perform the system control command to cause a change in system state of the controlled system, wherein the controlled system comprises a home automation system, and wherein the change in the system state comprises a change in device state of a device of the home automation system, wherein the device state comprises an activation state of the device or a set point of the device;

observe the change in the system state of the controlled system in response to performing the system control command;

generate a new dialog pattern based on the input text and the change in the system state, wherein the new dialog pattern is associated with the system control command; and update the language model to include the new dialog pattern.

15. The one or more non-transitory, computer-readable storage media of claim 14 further comprising a plurality of instructions that in response to being executed cause the computing device to:

generate a text response using the language model in response to determining the one or more parameters, wherein the matching pattern is associated with the text response; and present the text response to a user of the computing device.

16. The one or more non-transitory, computer-readable storage media of claim 14, wherein:

the system control command comprises a home automation command;

the one or more parameters of the home automation command include a location, a device, or a requested device state; and the context model includes conversational context data, user context data, or home automation device context data.

17. The one or more non-transitory, computer-readable storage media of claim 16, wherein to determine the one or more of the parameters of the home automation command using the context model comprises to determine a location parameter, a device parameter, or a device state parameter of the home automation command based on the conversational context data.

18. The one or more non-transitory, computer-readable storage media of claim 16, wherein to determine the one or more of the parameters of the home automation command using the context model comprises to determine a location parameter of the home automation command based on the user context data.

19. The one or more non-transitory, computer-readable storage media of claim 16, wherein to determine the one or more of the parameters of the home automation command using the context model comprises to determine a device parameter or a device state parameter of the home automation command based on the home automation device context data.

20. The one or more non-transitory, computer-readable storage media of claim 16, further comprising a plurality of instructions that in response to being executed cause the computing device to:

determine whether the home automation command is valid based on the home automation device context data of the context model in response to determining the one or more parameters of the home automation command; and generate an error message for the text response using the language model in response to determining that the home automation command is not valid;

wherein to generate the system control command based on the language model comprises to generate the home automation command in response to determining that the home automation command is valid.

\* \* \* \* \*